United States Patent [19]
Tashiro et al.

[11] Patent Number: 5,286,185
[45] Date of Patent: Feb. 15, 1994

[54] METHOD AND APPARATUS FOR CONTINUOUSLY SHAPING BAR-SHAPED BREAD

[75] Inventors: Yasunori Tashiro; Michio Morikawa; Torahiko Hayashi; Shigeo Uesawa; Toru Watanabe, all of Utsunomiya, Japan

[73] Assignee: Rheon Automatic Machinery Co., Ltd., Utsunomiya, Japan

[21] Appl. No.: 12,073

[22] Filed: Feb. 1, 1993

[30] Foreign Application Priority Data

| Mar. 30, 1992 | [JP] | Japan | 4-105498 |
| Jun. 10, 1992 | [JP] | Japan | 4-176118 |
| Jul. 30, 1992 | [JP] | Japan | 4-223290 |
| Jul. 30, 1992 | [JP] | Japan | 4-223291 |

[51] Int. Cl.$^5$ .......................... A21C 3/06; A21C 5/08; A21C 11/10
[52] U.S. Cl. ...................... 425/140; 83/932; 264/145; 425/142; 425/148; 425/296; 425/302.1; 425/308; 425/319; 425/322; 425/334; 426/501; 426/503; 426/518
[58] Field of Search ........... 425/141, 140, 142, 145, 425/148, 296, 297, 308, 319, 320, 322, 334, 299, 302.1; 264/40.4, 145, 281; 426/501, 503, 518, 512; 83/932

[56] References Cited

U.S. PATENT DOCUMENTS

| 4,692,107 | 9/1987 | Morikawa et al. | 425/140 |
| 4,734,024 | 3/1988 | Tashino | 425/132 |
| 4,746,525 | 5/1988 | Croto et al. | 425/322 |
| 4,883,417 | 11/1989 | Morikawa et al. | 425/148 |
| 5,098,273 | 3/1992 | Tashiro | 425/132 |
| 5,112,631 | 5/1992 | Nakamura | 426/500 |
| 5,209,939 | 5/1993 | Kempf | 425/141 |
| 5,223,277 | 6/1993 | Watanabe et al. | 425/308 |

FOREIGN PATENT DOCUMENTS

2523811  9/1983  France ................. 425/308

Primary Examiner—Khanh Nguyen
Attorney, Agent, or Firm—Guy W. Shoup; Patrick T. Bever

[57] ABSTRACT

An apparatus for manufacturing various shapes of bread that includes a device for forming a continuous sheet of bread dough, a roller for winding up the sheet of bread dough traveling on a horizontal conveyor from one of its sides into a bar of bread dough, the conveyor causing the bar to fall from its downstream end, and a cutter for cutting the falling dough body into dough pieces by squeezing it with flat surfaces of the cutter, according to its preset weight or length.

6 Claims, 4 Drawing Sheets

METHOD AND APPARATUS FOR CONTINUOUSLY SHAPING BAR-SHAPED BREAD

BACKGROUND OF THE INVENTION

1. Field of the Invention

This invention relates to an apparatus and method for manufacturing various kinds of bar-shaped bread, such as French bread, and more especially to a process of continuously manufacturing bar-shaped bread of various sizes and of uniform weight per unit size by winding up a continuously fed sheet of dough and dividing the wound dough body.

2. Prior Art

In the prior art method of manufacturing these kinds of bread, the shape of each type of bread to be produced is determined by an apparatus exclusively designed for manufacturing that type of bread.

In the prior art method, bread dough is measured and divided according to the length or thickness of the bread to be produced, the divided bread dough is shaped into a spheroid, the shaped bread dough is stretched into a desired length, and then the stretched bread dough is fermented and baked. In such a stretching process some drawbacks are inevitable, such as the gluten network of the bread dough being destroyed or a lower quality.

There has been no one automatic apparatus for shaping bar-shaped bread that can freely produce bread of any length and thickness without needing any type of extra shaping process.

A publication entitled *A Collection of Well-known Art*, published Feb. 20, 1980, by the Japanese Patent Office, shows a winder having a roller for winding up a continuous sheet of dough from one of its sides into a bar of dough.

The winder has not been used for shaping bar-shaped bread dough of various sizes from a continuously fed sheet of dough. It is used for obtaining a long rolled-up product that may then be cut into pieces of rolled-up dough. It has a drawback in that when the weight of a dough sheet to be supplied is not uniform, no product of a uniform weight can be produced.

Therefore, when high-quality bar-shaped bread of various sizes is prepared from a continuously fed mass of dough, an apparatus and method has been required in which the gluten network of the dough is not destroyed and a product of a uniform weight, which is not too soft, has a proper toughness to the teeth, and that has smoothly shaped surfaces where it is cut, can be produced.

SUMMARY OF THE INVENTION

One object of the invention is to provide an apparatus and method by which a continuously fed mass of dough is continuously processed to produce separate pieces of bar-shaped bread of a uniform weight, without destroying the gluten network of the dough.

Another object of the invention is to provide a simple apparatus and method in which separate pieces of bar-shaped bread of various sizes are continuously manufactured from a mass of dough in a small number of steps.

Still another object of the invention is to provide an apparatus and method by which any bar-shaped bread of a desired size can be produced with sections where it is cut that are smooth and round.

Another object of the invention is to provide an apparatus and method by which the amount to be produced can be changed while bar-shaped bread dough pieces of a desired uniform weight are being produced so that production can easily be controlled.

The first aspect of this invention provides a method of continuously manufacturing bar-shaped bread of various sizes that comprises causing a continuous mass of bread dough to travel on a horizontal conveyor, stretching said traveling mass of bread dough into a dough sheet of a uniform breadth and thickness, winding up the traveling dough sheet from one side thereof to form a bar-shaped dough body extending in the direction the dough sheet moves, causing the dough body to freely fall at the downstream end of the conveyor, and cutting the freely falling dough body at a preset time by squeezing the dough body with a cutter having flat pressing surfaces.

The second aspect of this invention provides a method for cutting the freely falling dough body that is characterized by the step of simultaneously causing the two pressing surfaces to move toward each other and to move in directions tangential to the periphery of the dough body.

The third aspect of this invention provides a method for controlling the cutter that is characterized in that the dough body is cut while the pressing surfaces of the cutter are reciprocated along the traveling direction of the dough body in such a manner that they move up when they move away from each other and move down when they move toward each other.

The fourth aspect of this invention provides a method for controlling the cutting operation that is characterized in that the dough body is cut by the cutter when it receives a timing signal to cut the dough body. The signal is produced by control means that senses the weight of each part of the dough body traveling on the conveyor and that emits signals for the cutter to cut the dough body. Alternatively, the dough is cut by the cutter when the dough body travels a preset length.

The fifth aspect of this invention provides a method for cutting bar-shaped bread of a desired length from the continuously shaped dough body that is characterized by the steps of continuously weighing each part of the wound bar-shaped dough body during a given distance over which the bar-shaped dough body passes on the conveyor, memorizing the weights obtained along with information on the position of each part of the bar-shaped dough body where the weights were obtained, based on the obtained weights calculating the length of the dough body that corresponds to a target weight, and driving the cutter based on the calculated length so that the desired length of each bar-shaped bread dough piece is obtained.

The sixth aspect of this invention provides a method of adjusting the amount of bar-shape bread produced from the continuously shaped dough body that is characterized by the steps of calculating the amount, in total weight or number of pieces, produced during a preset period, comparing the obtained amount with a target amount to obtain the difference between them, and transmitting a drive signal to the conveyor to compensate for the difference by increasing or decreasing the speed of the conveyor.

The seventh aspect of this invention provides a method of adjusting the weight of bread dough pieces cut from the continuously shaped dough body that is characterized in the steps of weighing the cut bar-shaped bread dough pieces and comparing the weight of each of the cut bar-shaped bread dough pieces with the standard weight so that if there is any difference between them the time at which the dough body is cut and/or the rate at which the mass of bread dough is fed is adjusted accordingly.

The eighth aspect of this invention provides an apparatus for continuously shaping various kinds of bar-shaped bread that comprises a horizontal conveyor means for continuously causing a mass of bread dough to travel thereon, means for stretching said traveling mass of bread dough into a dough sheet of a uniform breadth and thickness, means for winding up the traveling dough sheet from one side thereof to form a bar-shaped dough body extending in the direction the dough sheet moves, and means for cutting the dough body positioned at the downstream end of said conveyor means below the level of the upper surface of said conveyor means, the cutting means having a plurality of vertical pressing surfaces to press the dough body inward in the horizontal direction.

The ninth aspect of this invention provides an apparatus for controlling the cutting means that is characterized by means for reciprocating the cutter along the traveling direction of the dough body to cause the pressing surfaces to move up when they move away from each other so that they receive the dough body between them and to move down when they move toward each other, to cut the dough body.

The tenth aspect of this invention provides an apparatus for cutting bar-shaped bread of desired lengths from the continuously shaped dough body that comprises means for continuously weighing each part of the wound bar-shaped dough body during a given distance over which the bar-shaped dough body passes on the conveyor, means for memorizing the weights along with information on the positions of the parts of the bar-shaped dough body where the weights were measured, means for calculating, based on the measured weights, the length of the dough body that corresponds to a target weight, and means for driving the cutting means based on the calculated length so that the desired length of each bar-shaped bread dough piece is produced.

The eleventh aspect of this invention provides an apparatus for adjusting the amount of the bar-shaped bread produced from the continuously shaped dough body that is characterized by means for calculating the amount of the dough product, in total weight or number of pieces, produced during a preset period, means for comparing the obtained amount with a target amount to obtain the difference between them, means for transmitting a drive signal to the conveyor, and means for compensating for the difference by increasing or decreasing the speed of the conveyor.

The twelfth aspect of this invention provides an apparatus for adjusting the weight of a bar-shaped bread piece cut from the continuously shaped dough body that comprises means for weighing each of the dough pieces cut from the bar of dough, means for comparing the weight of each of the cut dough pieces with the target weight, means for adjusting the timing at which the dough body is cut, and means for adjusting the rate at which the mass of bread dough is supplied whereby any difference found between the weight of each of the cut dough body pieces and the target weight can be compensated for.

DESCRIPTION OF THE PREFERRED EMBODIMENTS

The method of this invention will now be explained by reference to the drawings and based on one of the embodiments of the apparatus of this invention.

Figure 1:
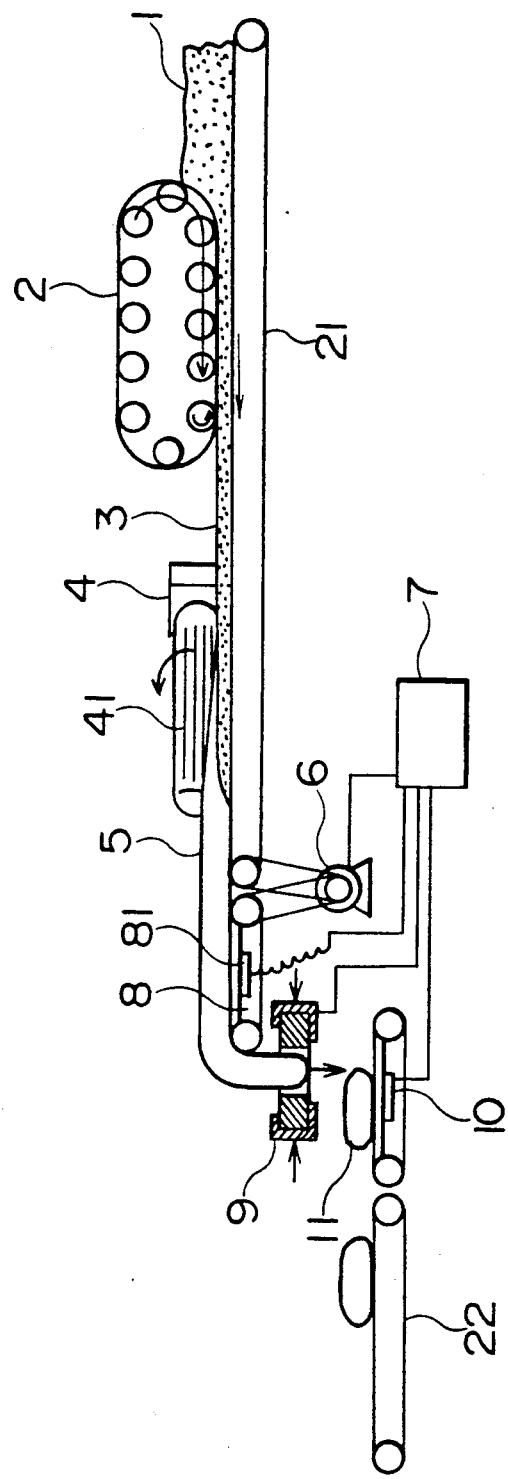
FIG. 1 is an overall schematic side view of one of the embodiments of the apparatus of this invention.

In FIG. 1, a stretcher 2 continuously stretches a mass of bread dough 1 supplied on a conveyor 21 into a continuous sheet of bread dough 3 of a constant width and thickness. Any conventional stretcher, such as the one disclosed in U.S. Pat. No. 4,692,107, can be used as the stretcher 2.

A winder 4 winds up rolls the stretched sheet of bread dough 3 into a continuous bar of bread dough 5. The winder 4 rolls the sheet up from one of its edges in a direction aslant its widthwise direction (perpendicular to the traveling direction of the dough sheet on the conveyor). It has a toothed roller 41 rotating in the direction shown by an arrow to wind up the sheet of bread dough. Any conventional side winder, such as those that are disclosed in the above-mentioned publication, can be used as the winder 4. A weighing conveyor 8, positioned adjacent and downstream of the conveyor 21, continuously measures the weights of the parts of the continuous bar of bread dough 5 being conveyed downstream. These weights are stored in a controller 7 along with information regarding the positions of the parts of the bar that are weighed on the weighing conveyor 8. These weights are measured by detecting the distance traveled by the dough bar on the weighing conveyor 8 by means of a rotary encoder or a rotary transducer 6.

A cutter 9 is positioned at the downstream end of and below the upper surface of the weighing conveyor 8. In response to the cutting signals sent from the controller 7, the cutter cuts and shapes the continuous bar of bread dough 5 hanging from the downstream end of the weighing conveyor 8. That is, the cutting is done based on the information about the measured weight or length of the continuous bar of bread dough S. Because of this arrangement, any type of bar-shaped bread can be freely produced, ranging from French bread having a slender shape, 50–60 mm wide and about 1 m long, to round bread.

The cutting operation directed by the controller 7 will now be explained in more detail.

In a simplified first method a target weight "a" of a product to be produced is set in advance in the controller 7. Then a sheet of dough 3 is produced and fed on the conveyor and wound into a bar of dough 5. The dough bar is transferred to the weighing conveyor 8 having weighing means 81. The weight A of a given unit length L, which may be 3 mm or even less, of the bar of dough 5, which is hereafter called part of the dough body, is measured. The measurements are stored in the controller 7 along with other information obtained by and fed from the detector 6, such as the distances traveled by the the dough body on the weighing conveyor 8 during a preset time. A length X of the bar of dough to be cut is calculated by the controller 7 by adding weight A obtained by the detector 6 of each part of the dough body so that the total of the weights approximates the target weight "a." Based on the calculated value, the controller 7 sends a signal to the cutter 9 so that the bar of dough is cut when the dough on the weighing conveyor 8 has traveled just the distance X from the position where the previous cutting was done. After each time the bar is cut the detector 6 is reset to zero so as to repeat the same weighing, calculating, and cutting procedures.

As a convenient but less accurate alternative, especially when a sheet of dough of a uniform width and thickness is fed, the length X is easily calculated from the following equation: $X = Lxa/A$, wherein L, unlike the preceding embodiment, can be longer than X, and can be the entire length of the upper surface of the weighing conveyor 8; A is the weight of the dough body having the length L; and "a" is the target weight. Based on a calculation using the above-mentioned formula, the position of a preset point on the bar of dough conveyed on the weighing conveyor 8, where cutting is to be done, can be stored in the controller 7 so that the controller 7 can send a signal to cut the bar of dough when that position comes to the cutter 9.

In either of the embodiments, a dummy cutting may be made at the start of the operation so as to set the starting point of the controller measurement.

As can be understood from the explanation above, the weight or the length of the product 11 is determined by the time at which it is cut. As with French bread, if the length of the product is important, the traveling distance of the bar of bread dough is measured instead of the weight, and based on the information about it the bar can be similarly cut so as to produce products having preset lengths.

Further, the quantity of the products produced can also be changed while the target weight of a piece of cut bar-shaped bread can be kept uniform by increasing or decreasing the velocities of the conveyors or the volume of dough fed from the dough-feeding device. This can be done when a preset amount to be produced is found to be different from the actual measurements. When any difference is found, the controller 7 sends a signal to increase or decrease the rate at which the sheet of bread dough is fed so that the difference is compensated for. Thus, this invention can make production control easier.

Referring again to FIG. 1, a second weighing conveyor 10 may also be positioned under the cutter 9 and connected at its downstream end to a discharging conveyor 22. The second weighing conveyor reweighs the cut piece of the bar of dough 11 to see if the weight of the cut piece conforms to the target weight. If not, the controller 7 adjusts the timing for the rate at which the dough is fed.

Figure 2:
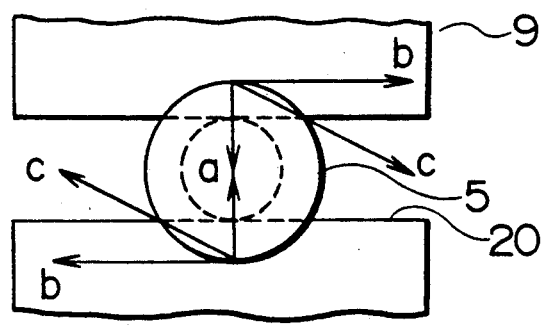
FIG. 2 is a sketch explaining the process of shaping each of the sections being cut as a spheroid.

As shown in FIG. 2, an embodiment of the cutter 9 of this invention has two pressing surfaces 20, which are flat. They are unlike those conventional blades that are shaped as a wedge. The pressing surfaces 20 are preferably at least 30 mm thick, especially when they cut French bread. Thus, the sections where the bar of bread dough 5 are cut are smooth and round. This is due to the effect of a tangential stress generated at the contact area of the dough bar when the pressing surfaces 20 slidably move in the directions tangential to the periphery of the bar An experimental example shows that when thin pressing surfaces 20 are used, the resulting cut sections are rough, as where conventional sharp-edged cutting members are used, instead of the above-mentioned round surfaces. Thus, if the thickness of the pressing surface is less than a certain limit, say, 25–30 mm, it is less effective in cutting. This is especially true with French bread, so that the cut sections are not shaped into smooth and round surfaces.

However, depending on the consistency of the dough bar, the thickness can be less than 25 mm. In the cutter 9, which has the pressing surfaces shown in FIG. 2, the two pressing surfaces 20 are pressed against the periphery of the continuous bar of bread dough 5 from two directions, toward its center, while they move parallel with, but opposite to, each other. In FIG. 2 the arrows "a" and "b" show the directions of the vectors of the pressing forces directed by the pressing surfaces 20 of the cutter 9 to the periphery 5 of the bar of bread dough. The arrow "c" shows the direction of the vector derived from the two vectors combined. This combined vector, or the torsional force, also helps the layers of the dough sheets adhere to each other where they overlap at the winding step. The torsional force also gives good effects to the shaping of bread dough by orienting its texture in a peripheral direction.

Figure 5:
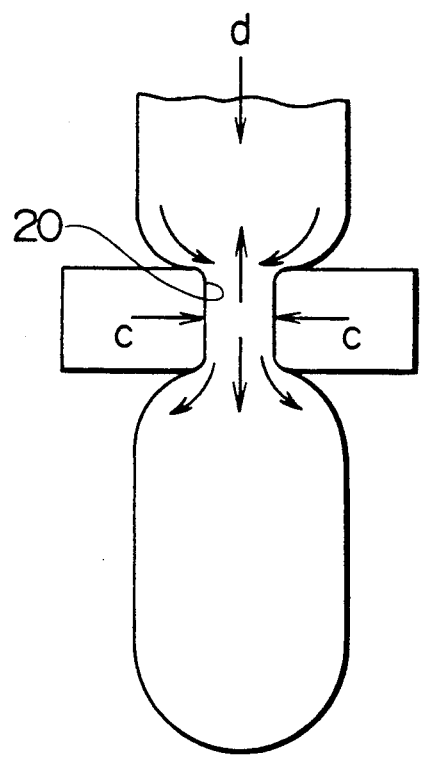
FIGS. 5 and 6 are sketches explaining the cutting function of the cutter of this invention, having thick pressing surfaces.
Figure 6:
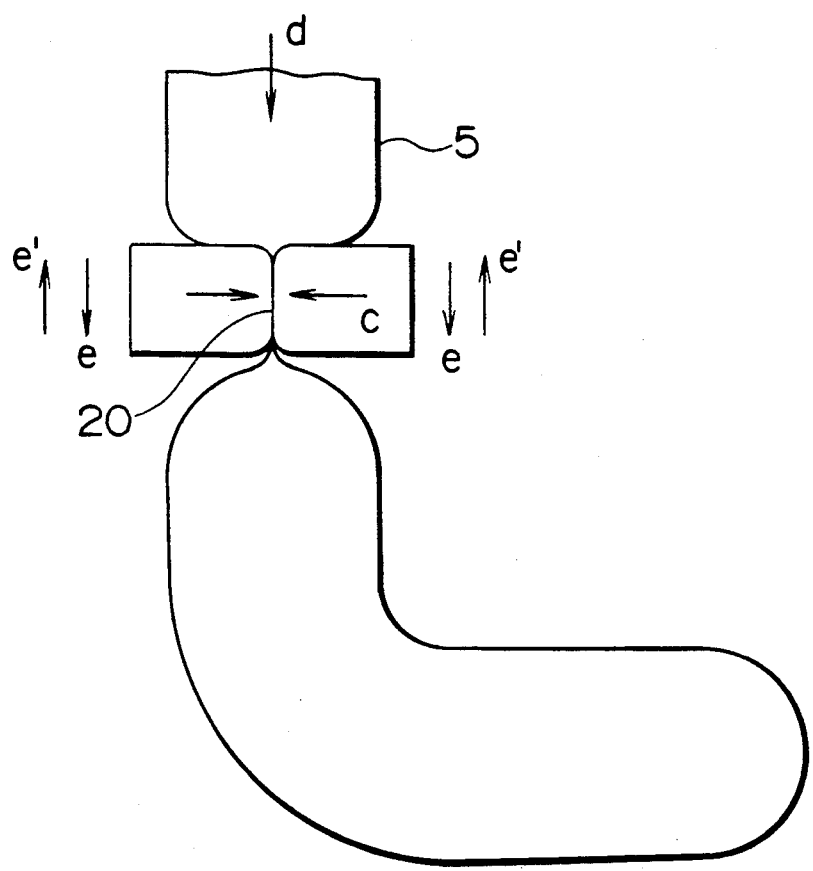

The arrow "d" in FIG. 5 shows the direction traveled by the bar of bread dough 5 continuously supplied. While it is thus continuously supplied, the pressing surfaces 20 move up and down, as shown by the arrows "e" and "e'," respectively, in FIG. 6, in conformity with the speed with which the bar is supplied, so as to avoid a lag in the cutting operation. When the pressing surfaces 20 move up they move away from each other to allow the bar of bread dough 5 to pass between them, and when they move down they move toward each other to squeeze the dough bar.

Figure 3:
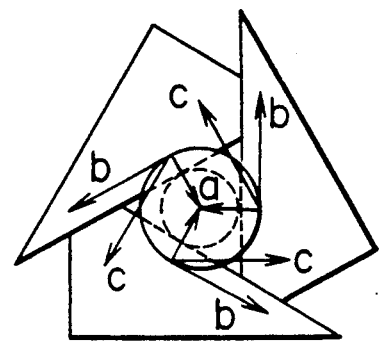
FIGS. 3 and 4 show the cutters having three and six pressing surfaces, respectively.
Figure 4:
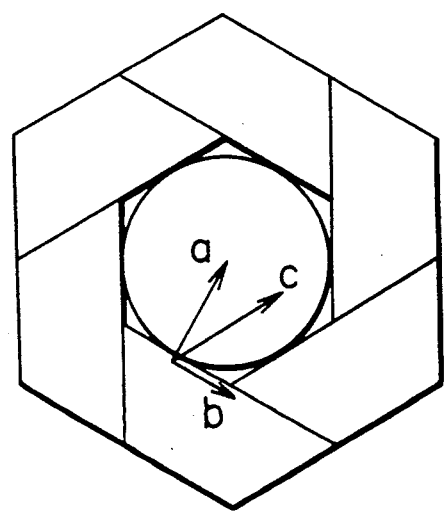

FIGS. 3 and 4 show other embodiments of the cutter of this invention. FIG. 3 and FIG. 4 have three and six pressing surfaces, respectively. Any of those cutters disclosed in U.S. Pat. Nos. 4,734,024 and 5,098,273 can also be used to cut the bar of bread dough 5.

EFFECTS OF THE INVENTION

As stated above, this invention can achieve the manufacture of various sizes of bar-shaped bread by using a simple process or an apparatus of a simple structure, and has great industrial effects in reducing production costs.

I claim:

1. An apparatus for continuously shaping various kinds of bar-shaped bread dough pieces, comprising
   a horizontal conveyor means for continuously conveying a mass of bread dough to travel thereon in a traveling direction,
   means for stretching said traveling mass of bread dough into a dough sheet of a uniform breadth and thickness,
   means for rolling the traveling dough sheet from one side thereof to form a bar-shaped dough body extending in the traveling direction, and
   means for cutting a portion of the dough body hanging from a downstream end of the conveying means, said cutting means positioned at the downstream end of said conveyor means below the level of the upper surface of said conveyor means, the cutting means having a plurality of vertical pressing surfaces to press the dough body inwardly in a horizontal direction.

2. An apparatus of claim 1, further comprising means for reciprocating the cutter means along a vertical direction to cause the pressing surfaces to move up when the pressing surfaces move away from each other to receive the dough body between them and to move down when the pressing surfaces move toward each other to cut the dough body.

3. An apparatus for continuously shaping bar-shaped bread dough pieces, comprising:
 a conveyor means for causing a mass of bread dough to travel thereon,
 means for stretching the mass of bread dough conveyed on the conveyor means into a sheet of dough,
 means for rolling the dough sheet to form a bar-shaped dough body,
 means for continuously weighing each part of the bar-shaped dough body during a given distance over which the bar-shaped dough body passes on the conveyor,
 means for storing the weights along with information regarding the positions of each part of the bar-shaped dough body,
 means for calculating the length of the dough body that corresponds to a target weight, based on the obtained weights,
 means for cutting a portion of the bar-shaped dough body which is hanging from one end of the conveyor, said cutting means including flat pressing surfaces, and
 means for driving the cutting means based on the calculated length so that the desired length of each respective bar-shaped bread dough piece is obtained.

4. An apparatus of claim 3, further comprising
 means for determining the amount of the dough product, in total weight or number of pieces, produced during a preset period,
 means for comparing the determined amount with a target amount to be produced to obtain any difference between them,
 means for transmitting a drive signal to the conveyor, and
 means for compensating for any difference by increasing or decreasing the speed of the conveyor.

5. An apparatus of claim 3, further comprising
 means for weighing each of the dough pieces cut from the bar of dough,
 means for comparing the weight of each of the cut dough pieces with the target weight,
 means for adjusting a rate at which the dough body is cut in response to the compared weights, and
 means for adjusting the rate at which the mass of bread dough is supplied, whereby any difference found between the weight of each of the cut dough body pieces and the target weight can be compensated for.

6. An apparatus of claim 4, further comprising
 means for weighing each of the dough pieces cut from the bar of dough,
 means for comparing the weight of each of the cut dough pieces with the target weight,
 means for adjusting a rate at which the dough body is cut in response to the compared weights, and
 means for adjusting the rate at which the mass of bread dough is supplied, whereby any difference found between the weight of each of the cut dough body pieces and the target weight can be compensated for.

* * * * *